Patented Jan. 27, 1931

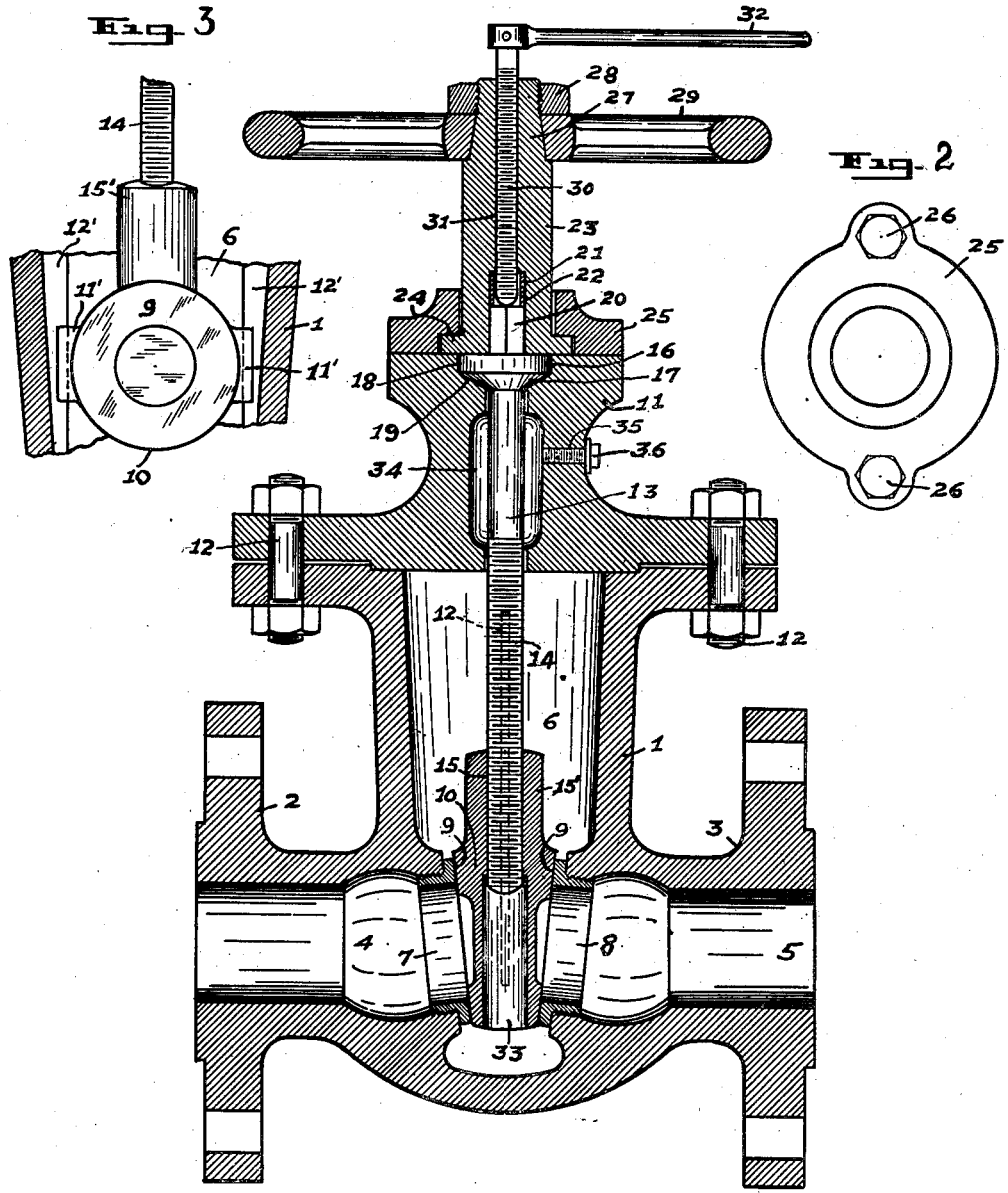

1,790,363

UNITED STATES PATENT OFFICE

NILES ATTERBURY, OF PITTSBURGH, PENNSYLVANIA

VALVE

Application filed March 10, 1930. Serial No. 434,533.

My invention relates to certain new and useful improvements in valves, and while the invention is herein disclosed as embodied in a gate valve, it is obvious that the principle of the invention may be employed in any other type of valve or for any purposes wherein it is found to be applicable.

Important objects of the invention are to provide a valve of the character described, which requires no packing to render same impervious to leakage, which is simple in its construction and arrangement, strong, durable and efficient in its use, compact, positive in its action and comparatively inexpensive to manufacture and maintain.

With the foregoing and other objects in view which will appear as the description proceeds, the invention resides in the combination and arrangement of parts and in the details of construction hereinafter described and claimed, it being understood that changes in the precise embodiment of the invention hereinafter disclosed can be made within the scope of what is claimed without departing from the spirit of the invention.

In the drawing wherein like numerals of reference designate corresponding parts throughout the several views:—

Figure 1 is a vertical cross sectional view of a gate valve embodying the present invention.

Figure 2 is a top plan view of the bonnet head.

Figure 3 is an end view of the disk gate and of associated parts, the latter being in cross section and broken away.

Referring in detail to the drawing 1 denotes a body portion or valve casing having flanged ends 2 and 3 for permitting the connection of the device in an associated conduit in the usual manner. The valve casing is provided with conduit passages 4 and 5 which extend through respective valve ends 2 and 3. The inner ends of the passages 4 and 5 communicate with the lower end of a valve chamber 6, which is formed in the casing 1 and extends at right angles relatively to said passages 4 and 5.

A pair of seat rings 7 and 8 are threadedly secured in the inner ends of respective passages 3 and 4. The inner faces 9 of the seat rings 7 and 8 are disposed angularly and are adapted for seating the disk gate 10, which is disposed therebetween. The disk gate 10 is tapered to effect a wedging action when engaging the angularly disposed faces 9 of the seat rings 7 and 8 to close the valve.

The disk gate 10 is provided with a pair of laterally disposed, grooved ears 11', which are engaged on respective guides 12' formed on the wall of the valve chamber 6 for maintaining the proper alignment of the disk gate 10 within the latter and between the seat rings 7 and 8.

The valve casing 1 includes a flanged bonnet 11, which latter is mounted on the flanged top of the valve casing 1 and secured to the latter by a plurality of bolts 12. A lower valve stem 13 is revolubly mounted in and extends through the center of the bonnet 11, and has a lower threaded portion 14, which extends into the valve chamber 6 and threadedly engages in a correspondingly threaded aperture 15 provided in a shank 15' formed integral with the top of the disk gate 10.

The upper end of the valve stem 13 is provided with an annular shoulder 16 having a tapered lower face 17. The top of the bonnet 11 is formed with a recess 18 for the reception of the shoulder 16 and includes a tapered seat 19, which is adapted for engagement by the tapered lower face 17 of the shoulder 16. The top of the shoulder 16 is exactly flush with the top of the bonnet 11.

The upper end portion of the lower stem 10 is provided with a squared shank 20 which is formed with a pocket 21, and is disposed above the shoulder 16. The squared shank 20 extends into a correspondingly shaped aperture 22 formed in the lower end of an upper stem 23. The latter is provided with a flanged lower end 24, and is revolubly mounted on top of the bonnet 11. The upper stem 23 is secured to rotate on the top of the bonnet 11 by a head 25. The latter overlaps the lower flanged end 24, and is secured in position on the top of the bonnet 11 by bolts 26.

The upper stem 23 is provided with a tapered upper end 27, a portion of which is threaded for the engagement of a nut 28 for fixedly securing a hand wheel 29 to the tapered end 27 of the upper stem 23.

A locking screw 30 is mounted in a correspondingly threaded aperture 31 formed in the upper stem 23. The lower end of the locking screw 30 is revolubly engaged in the pocket 21 formed in the upper end of the lower stem 13. The upper end of the locking screw 30 projects beyond the top of the lower stem 23 and carries a fixed operating lever 32.

The disk gate 10 is provided with an aperture 33, which communicates with the threaded aperture 15 formed in the shank 15'. The purpose of the aperture 33 is to provide clearance for the lower threaded portion 14 of the lower stem 13 when the disk gate 10 is shifting to the open position in a manner hereinafter set forth.

A chamber 34 is formed in the bonnet 11 and communicably joins with an aperture 35 which is closed by a plug 36. This arrangement is provided to permit the draining of condensations from the device and for lubricating the latter.

The manipulation of the hand wheel 29 will rotate the upper valve stem 23, and the latter will impart like rotation to the lower valve stem 13, owing to the connection of the squared shank 20 in the squared aperture 22. The rotation of the lower stem 13 will shift the disk gate 10 to open or close the device due to the threaded connection of the stem portion 14 in the disk gate shank 15'.

The feature of the present invention resides in the novel means for preventing leakage without the use of packing. This is effected by seating the lower face 17 of the shoulder 16 in the tapered seat 19 of the recess 18. When the disk gate 10 has been suitably adjusted to the desired position in the valve casing 1, by the manipulation of the hand wheel 29, the locking screw 30 is rotated, by the manipulation of the lever 32, for forcibly seating the shoulder face 17 against the recess seat 19. As the shoulder 16 normally has an accurate sliding fit in the recess 18, it will be obvious that but an infinitesimal movement of the lower stem 13, by the action of the locking screw 30 in the manner stated will effect the proper seating of the shoulder face 17 against the recess seat 19 to render the latter impervious to leakage therethrough.

The present invention provides a most efficient device of its kind, which will function indefinitely without attention, and which obviates the necessity of periodical repacking as invariably required in analogous devices now in use.

What I claim is:

1. In a valve structure, a casing, a valve member, an inner stem operatively connecting with said valve member for shifting the latter to the opening and closing position, an outer stem connecting with said inner stem and operable for actuating the latter, said casing being provided with a recessed seat, a shoulder carried by said inner stem and seating in said recessed seat, and a locking screw threadedly mounted in said outer stem and engaging said inner stem for forcing and maintaining said shoulder in said recessed seat for preventing leakage from said casing around said inner stem.

2. In combination, a valve of the character described, comprising a casing providing a valve chamber, said casing including a bonnet secured to said casing, a valve member mounted in said valve chamber, an inner stem revolubly mounted in said bonnet and threadedly engaging said valve member for shifting the latter to the opening and closing positions, an outer valve stem connecting with said inner stem for actuating the latter, means for revolubly securing said outer stem to said bonnet, a shoulder carried by said inner stem, said bonnet being formed with a recessed seat seating said shoulder, and a locking screw threadedly mounted in said outer stem and engaging said inner stem for forcing and maintaining said shoulder in said recessed seat for preventing leakage from said casing around said inner stem.

In testimony whereof I affix my signature.

NILES ATTERBURY.